United States Patent [19]
Brooks

[11] Patent Number: 5,459,628
[45] Date of Patent: Oct. 17, 1995

[54] DISK DRIVE WITH PROFILED ATTACHMENT OF A SPINDLE AND HUB

[75] Inventor: Peter E. Brooks, Rochester, Minn.

[73] Assignee: International Business Machines Corporation, Armonk, N.Y.

[21] Appl. No.: 215,240

[22] Filed: Mar. 21, 1994

[51] Int. Cl.⁶ .................................................. G11B 17/02
[52] U.S. Cl. ......................................... 360/99.08; 360/98.07
[58] Field of Search ............................. 360/99.12, 98.08, 360/99.05, 98.07, 99.08

[56] References Cited

U.S. PATENT DOCUMENTS

| | | | |
|---|---|---|---|
| 4,503,530 | 3/1985 | Hinlein et al. | 369/270 |
| 4,717,977 | 1/1988 | Brown | 360/98 |
| 4,754,353 | 6/1988 | Levy | 360/106 |
| 4,819,105 | 4/1989 | Edwards | 360/98.08 |
| 4,910,620 | 3/1990 | Olbrich | 360/98.08 |
| 4,928,029 | 5/1990 | Wright | 360/98.08 X |
| 5,031,061 | 7/1991 | Hatch | 360/98.07 |
| 5,091,809 | 2/1992 | Conners et al. | 360/99.08 |
| 5,136,450 | 8/1992 | Moir | 360/135 |
| 5,148,338 | 9/1992 | Frugé | 360/98.07 |
| 5,160,865 | 11/1992 | Gururangan | 360/98.07 X |

Primary Examiner—John H. Wolff
Attorney, Agent, or Firm—Laurence R. Letson

[57] ABSTRACT

A technique for joining a hub and a spindle of a disk drive is disclosed wherein the hub and spindle are joined by an interference fit. The interface between the hub and the spindle is provided with a surface contact pattern having a zone of contact extending about the spindle of the disk drive motor in the form of a circle or a very narrow height cylinder. Extending either unidirectionally or bidirectionally from the continuous zone of contact are zones of surface contact alternating with zones of relief which eliminate contact between the hub and the spindle. The continuous contact zone circumscribing the spindle of the drive motor insures that the hub is anchored relative to the spindle and anchors the hub to prevent tilting or cocking of the hub with respect to the spindle and spin axis of the spindle. By preventing cocking or tilting of the hub, any resultant cocking or tilting of the disk stack is prevented thereby improving the operation and reliability of the disk drive and preventing disk stack wobble and track misregistration.

16 Claims, 4 Drawing Sheets

DISK DRIVE WITH PROFILED ATTACHMENT OF A SPINDLE AND HUB

FIELD OF THE INVENTION

This invention relates to disk drives of the hard disk type and specifically to the attachment of the disk drive spindle to the disk drive hub.

BACKGROUND OF THE INVENTION

As with any device incorporating an electric motor, the disk drive motor generates heat as it operates and thus warms the motor and related parts of the device, thereby creating thermal expansion of the motor components and the disk drive components. This thermal expansion, focusing on the spindle or rotor of the disk drive motor and a hub which is fitted over the spindle of the motor for carrying the rotatable disks for data storage, is both radial and longitudinal expansion or growth.

In order to insure the most reliable connection between the hub and the spindle of the disk drive and eliminate other attachment hardware, the hub is typically shrink fitted onto the drive motor spindle. The shrink fit and assembly of the hub spindle insure an interference fit and reliably couples the hub to the spindle for rotation with the drive motor spindle. Alternatively, the interference fit may be accomplished by a force fit.

With an interference fit between the hub and the spindle of the drive motor, the connection is totally dependent upon friction between the two surfaces with the forces normal to the surface at any particular point provided by the combination of stretch of the hub or compression of the spindle.

Inasmuch as the assembly is dependent upon the surface-to-surface engagement and friction, thermal expansion and thermal growth mismatch will occur both radially and longitudinally. The radial change in forces will be generated by the relatively larger expansion of the hub in a radial direction than the radial expansion of the spindle. The longitudinal forces will be created as a result of the mismatch in the expansion rates between the spindle and the hub, typically made from a ferrous material such as stainless steel and aluminum or aluminum alloy, respectively. As the parts are warmed by operation of the disk drive motor, there will be a force created along the interface between the spindle and the hub in a direction parallel to the spindle axis of rotation. The frictional forces between the hub and the spindle will act to resist any movement between the hub and the spindle.

Since the hub and the spindle expand at different rates due to the dissimilarities of the materials, some portions of the hub will attempt to move relative to the spindle along the direction of the forces generated at the interface which lies substantially parallel to the axis of the drive motor and the spindle. The amount of force which may be generated between the hub and the spindle will vary from region to region due to the frictional engagement between the hub and the spindle, but the force will be inherently limited by the coefficient of friction between the two surfaces and the forces normal to those surfaces, for any unit of area. As the temperature of the hub and the spindle rise during operation of the disk drive, longitudinal forces will increase; and at some point, the forces generated by the longitudinal thermal growth mismatch of the spindle and hub will exceed the resistance provided by friction between the two components. Whenever that occurs, there will be some translation between the two parts at that particular point. Typically, on any longitudinal line or zone of contact lying on the interface surfaces between the hub and the spindle parallel to the drive motor axis, there will be one point where no movement will occur as well as points on one or both sides of that point where such relative movement does occur. The point where the movement does not occur may be referred to as an anchor point due to the anchoring which results, at that point, from the frictional forces.

When the anchor point for one portion of the hub/spindle interface is not located on a line or within a very narrow band which is defined by the rotation of a radius about the axis of rotation of the disk drive motor, there will be movement of various portions of the hub in different directions in varying amounts, all dependent upon and relative to the location of the anchor points around the spindle/hub interface. With different directions and different amounts of movement, the result will be a cocking or tilting both of the hub and also the disk stack attached thereto relative to the spindle and rotation axis. This tilting will cause the hub to assume an off axis position with respect to the axis of rotation of the disk drive motor and will thus cause a wobble of both the hub and the disks as they rotate and track misregistration.

Prior efforts to accommodate thermal expansion and thermal mismatch have been attempted by leaving a gap between the inner cylindrical surface of the disks or the hub and the spindle of the disk drive motor. This permits radial expansion of the spindle without distorting the hub; and where the gap is left between the hub and the spindle, it also tends to overcome the problems presented by a interference fit between the hub and the spindle. However, this design arrangement requires clamping of the hub to the disk and, accordingly, results in additional hardware, mass, and balance problems. Further, leaving a gap between the hub and the spindle to accommodate thermal expansion at varying rates compounds problems of insuring concentricity of the disks with the spin axis of the spindle and hub. However, leaving a gap between the spindle and the hub permits radial expansion of the hub relative to the spindle without distortion of the hub. A similar problem typically is not encountered with respect to the hub and the disks inasmuch as the disks and the hub are matched with regard to the coefficient of expansion of the material, thereby eliminating distortion caused by mismatched thermal expansion.

Prior attempts to maintain the concentricity and accommodate thermal mismatch have utilized longitudinal ribs parallel to the axis of the disk drive motor to support the disk and spacers around the spindle. Sleeves and ribbed sleeves oriented longitudinally with respect to the spindle have been used both to surround the spindle and to space the hub from the spindle. In some cases the passages between the spindle and the hub or the spindle, disks and spacer rings have been used for cooling air passages in an attempt to reduce the temperature rise of the disk stack and its spacer rings and thereby reduce the amount of thermal expansion that must be accommodated.

None of the above approaches address the longitudinal thermal expansion which is encountered in the hub and which creates a thermal growth mismatch and possible movement of part of the hub with respect to the spindle. Accordingly, none of these approaches address the problem of cocking or tilting of the disk stack as a result of thermal expansion of the disk drive components during operation. Any tilting or cocking of the disk stack relative to the axis of the drive motor can result in track misregistration and/or wobble, both of which will cause the disk drive to malfunction with respect to the reliable writing and reading of data on the magnetic disks.

SUMMARY OF THE INVENTION

It is an object of the invention to eliminate tilting of the disk stack caused by thermal expansion.

It is another object of the invention to control relative displacement between portions of the spindle and the hub of a disk drive caused by thermal expansion mismatch.

It is still another object of the invention to create an anchoring line or zone of contact between the hub and the spindle at a defined circular line or zone surrounding the spindle.

It is a further object of the invention to anchor the hub relative to the spindle at points lying on a circumscribed circular path around the spindle.

The objects of the invention are accomplished and the shortcomings of the prior solutions are overcome by precisely defining a circular or very narrow cylindrical contact zone between the hub and spindle of a disk drive with stabilizing zones of contact extending from the circular contact zone in directions which are parallel to the axis of the disk drive motor.

The hub is attached to the spindle by a shrink fit or alternatively a press or force fit. The resistance to movement of the hub at the circumscribing zone of contact is higher than the resistance to movement of the hub at regions displaced, in a direction parallel to the axis of the disk drive motor, from the zone of contact. Thus, any movement preferably will occur in regions or zones of lower resistance and is thus localizable and the direction may be controlled and defined.

By anchoring the hub at a zone of contact which either is relatively narrow or which is a line that defines a circle or very narrow path forming a cylinder about the axis, the direction or directions of thermal growth may be selected and controlled. When the direction of thermal growth is the same for all longitudinal regions of the hub/spindle interface, any small discrepancies in the amount of thermal growth will be diminimus and will have very little or no affect on the orientation of the hub and disk stack. By controlling the direction and therefore the amount of movement of the hub with respect to the spindle at the hub/spindle interface, the cocking or tilting of the disk stack may be eliminated and the reliability of the disk drive increased.

A more complete understanding of the invention may be had from the attached drawings and the detailed description of the invention that follows.

DRAWINGS

FIGS. 3, 4, 5, and 6 are illustrations of patterns of contact zones which may be advantageously utilized in the instant invention.

FIGS. 7, 8, 9, 10, 11, 12, 13 and 14 are diagrams showing the relative locations of anchor points and datum points located at various locations on the hub/spindle interface.

DETAILED DESCRIPTION OF THE PREFERRED EMBODIMENTS OF THE BEST MODE CONTEMPLATED BY THE INVENTORS FOR CARRYING OUT THE INVENTION

Figure 1:
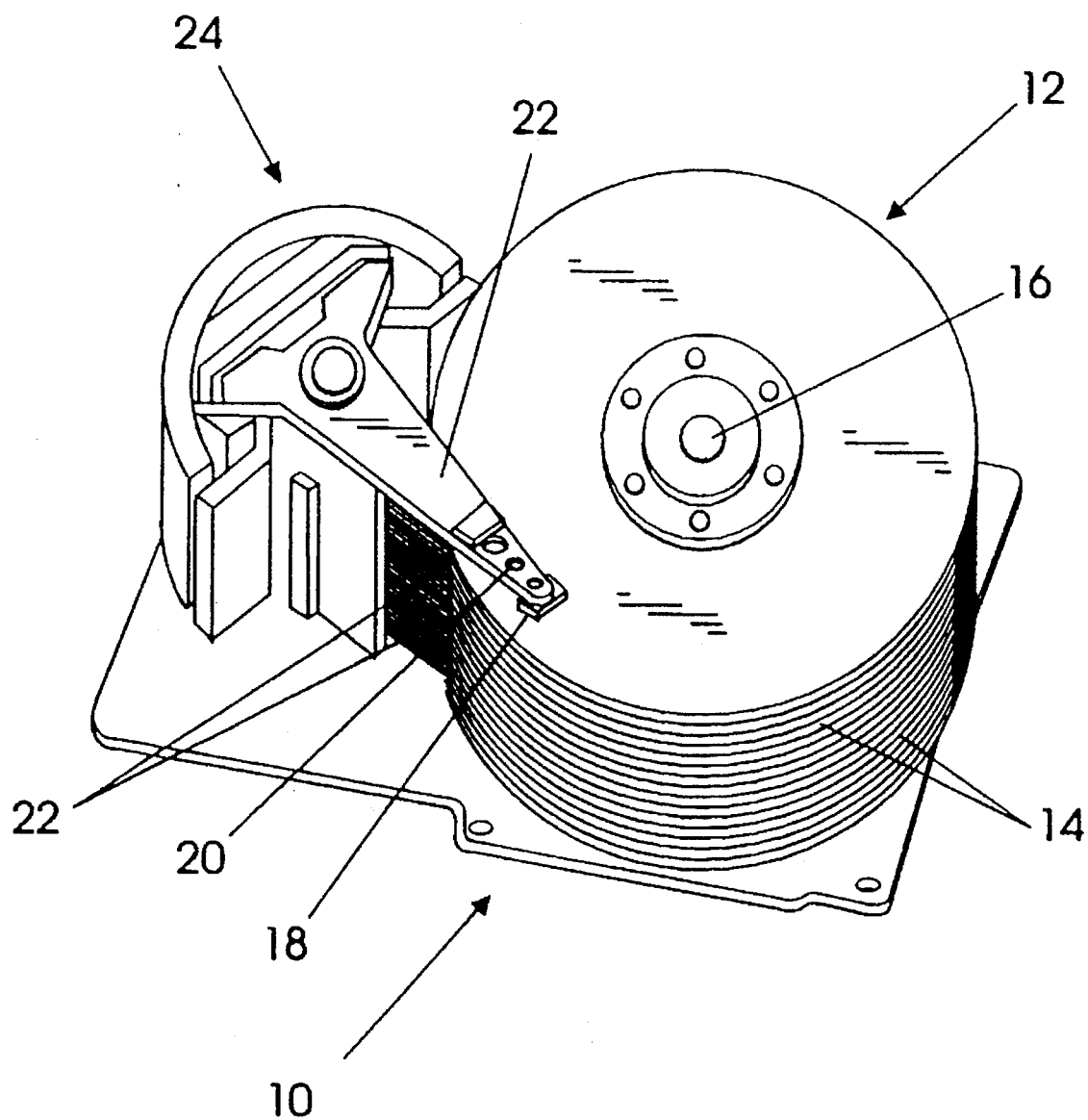
FIG. 1 is an illustration of a disk drive incorporating the invention.

Referring now to FIG. 1, a disk drive 10 without its protective cover is illustrated with a disk stack 12 comprised of disks 14, mounted for rotation about shaft 16 on frame 11. Data is recorded on and retrieved from disks 14 by magnetic heads 18 supported on load beams 20 which extend from actuator arms 22, all such components are conventional. Actuator arms 22, in turn, extend from the actuator mechanism 24 which positions the actuator arms 22 and the magnetic heads 18 relative to the rotating disks 14.

Figure 2:
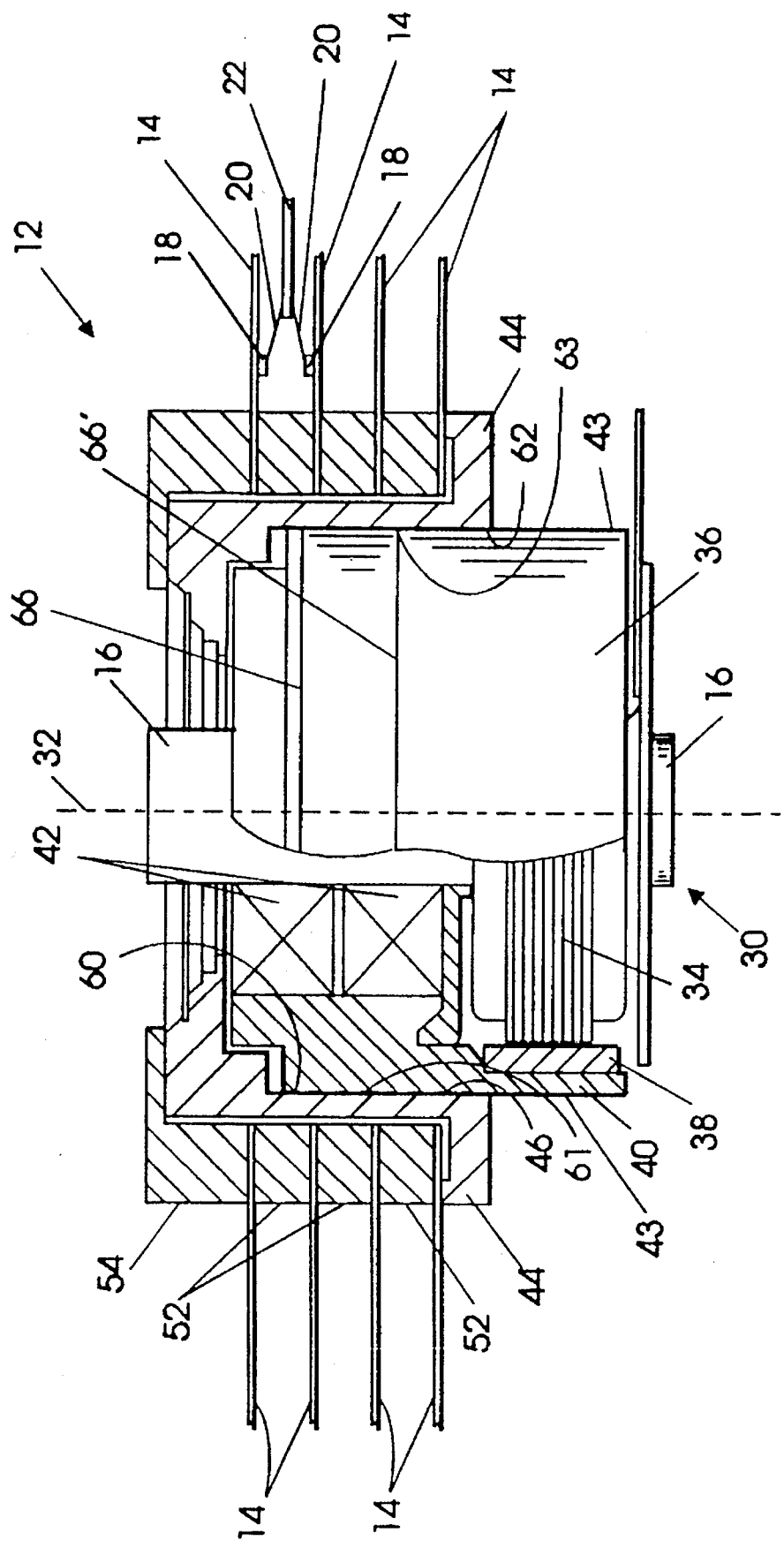
FIG. 2 is a partial cross-sectional view of the disks, hub, and disk drive motor of the FIG. 1.

In order to better understand the structure of the disk stack 12 and the drive arrangement incorporating the disk drive motor 30, reference is now made to FIG. 2. The disk drive motor 30 is made up of a shaft 16 extending along a disk drive motor axis 32. Shaft 16 is surrounded by the motor coil assembly 34 which provides the driving electromagnetic field for interaction with the rotor 36 comprised of field magnets 38 and spindle 40. Spindle 40 supporting field magnets 38 is rotatably mounted by means of precision bearings 42 about shaft 16. Rotor 36 thus will rotate in response to the electromagnetic fields of coil 34 and spin about axis 32. The external surface 43 of spindle 40 is typically cylindrical and of a very precisely controlled diameter.

Supported by the spindle 40 is a hub 44 having an internal cylindrical surface 46 of a precise diameter. Hub 44 is disposed around spindle 40 and engaged with spindle 40 at the internal cylindrical surface 46 of hub 44. The preferred method of engagement or attachment is to thermally shrink hub 44 onto spindle 40 thereby attaching hub 44 to spindle 40 with sufficient force to reliably rotate the hub 44 with the spindle 40 under all conditions. As is well known in the art, a shrink fit requires that the diameter of the hub 44 at its internal surface 46 be slightly smaller than the external diameter of spindle 40 at surface 43, so that as the spindle 40 is cooled and/or hub 44 is heated to cause the respective diameters to change sufficiently to allow the hub 44 to be disposed surrounding spindle 40 for assembly. Then the parts are returned to ambient temperature, resulting a shrinking of hub 44 onto the external surface 43 of spindle 40. Since hub 44 is attached to the spindle 40 by a shrink fit, the hub 44 is held in position on spindle 40 by frictional forces.

Mounting of the disks 14 is typically accomplished by placing disks 14 over hub 44 with spacer rings 52 disposed between the disks 14 with a clamping ring 54 positioned above the topmost disk 14 and that clamps the disk stack 12 of disks 14 and rings 52 to rigidly position the disks 14 relative to hub 44. A small gap is left between the hub 44 exterior 45 and the inner surface 51 of disks 14 and inner surface 49 of spacer rings 52 to accommodate radial thermal expansion of hub 44.

Figure 7:
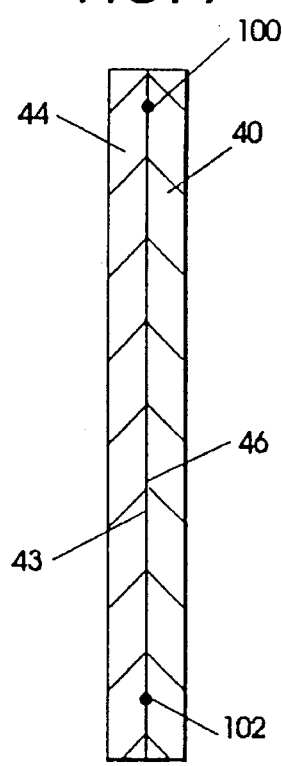
Figure 8:
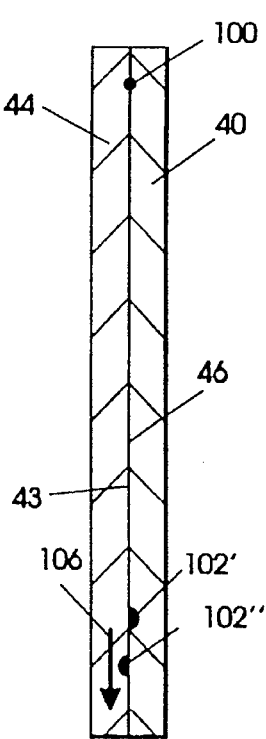
Figure 9:
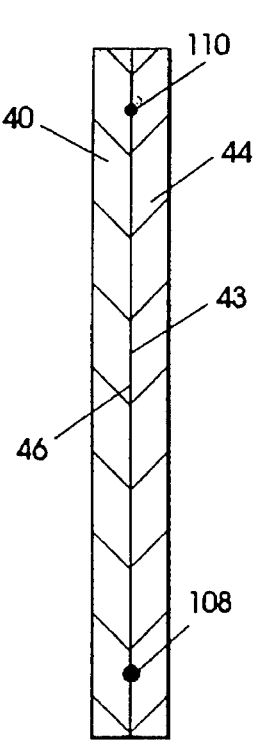
Figure 10:
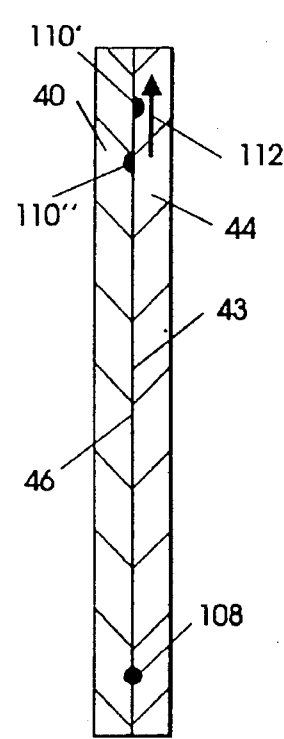
Figure 11:
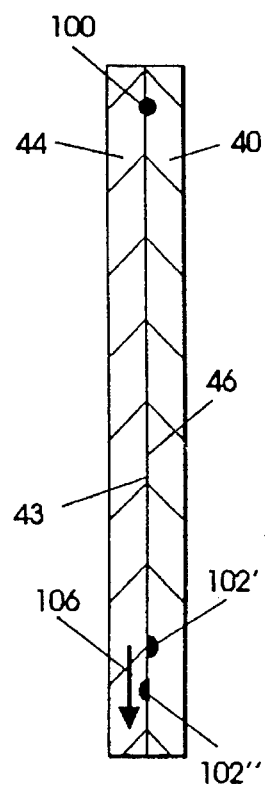
Figure 12:
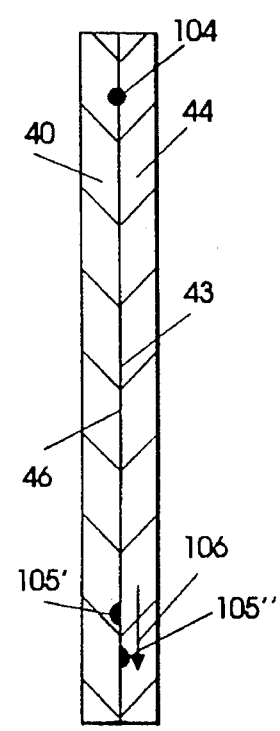

As a generalized discussion of the thermal growth and mismatch and its general effects, reference is now made to FIGS. 7 through 14 where a segment or longitudinal zone of contact of the spindle 40 and hub 44 are illustrated in a section view. In FIGS. 7, 8, 11, 13 and 14, the segments may be considered as illustrating the section illustrated on the left side of FIG. 2 where surfaces 43 and 46 form the hub 44/spindle 40 interface, while FIGS. 9, 10 and 12 illustrate the hub 44/spindle 40 interface on the right side of FIG. 2.

Anchor point 100 in FIG. 7 is assumed to be the point having the highest frictional resistance against movement between hub 44 and spindle 40 along the illustrated longitudinal zone 41. A datum point 102, formed of points 102' and 102" is illustrated, where points 102' and 102" are identically displaced from anchor point 100 at ambient temperature, and each point 102', 102" resides on one surface 43 or 46 of spindle 40 and hub 44 respectively.

Progressing to FIG. 8, hub 44 and spindle 40 are illustrated after being warmed by operation of the disk drive 10. The hub 44 has expanded and thermally grown more than the spindle 40 and the datum point 102" has been displaced farther in direction of arrow 106 from anchor point 100 than datum point 102'. Points 102' and 102" were co-located at 102 prior to warming and resident on surfaces 43 and 46 respectively.

Similarly, in FIG. 9, anchor point 108 and datum point 110 are illustrated at ambient temperature. With warming, as illustrated in FIG. 10, the datum points 110' and 110" are displaced by thermal growth with point 110' further shifted in direction of arrow 112 relative to datum point 110".

As can be seen, with FIG. 8 and FIG. 10 representing opposite sides of the spindle 40/hub 44 assembly, movement of points 102 and 110 in opposite directions as designated by arrows 106 and 112, hub 44 will tilt relative to spindle 40 and axis 32 shown in FIG. 2 thereby causing track misregistration and wobble.

When the anchor points about spindle 40 are all located on a line defined by the intersection of a plane perpendicular to axis 32 and the hub 44/spindle 40 interface or within a narrow zone 66 or 66' including such a line, the thermal growth of the hub 44 and spindle 40 results in two directions indicated by arrows 106 in FIGS. 11 and 12. With FIGS. 11 and 12 representing zones on the same hub 44/spindle 40 assembly but displaced from each other, the thermal growth results in displacement of datum points 102" and 105" relative to datum points 102' and 105' respectively in the directions indicated by arrows 106.

Because arrows 106 are parallel and in the same direction and because the thermal growth of the hub 44 and spindle 40 in each zone in FIGS. 11 and 12 results in essentially equal displacement of datum points 102" and 105", there will be minimal forces that may tend to cock or tilt the hub 44 and the disk stack 12.

Figure 13:
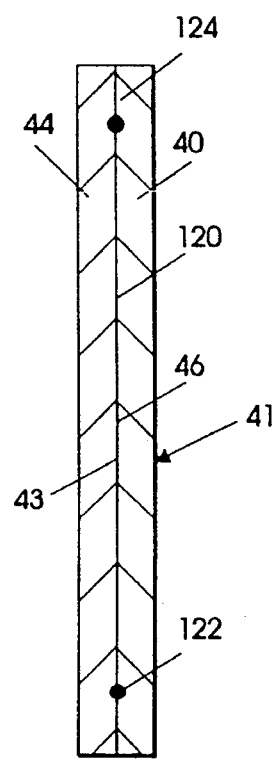
Figure 14:
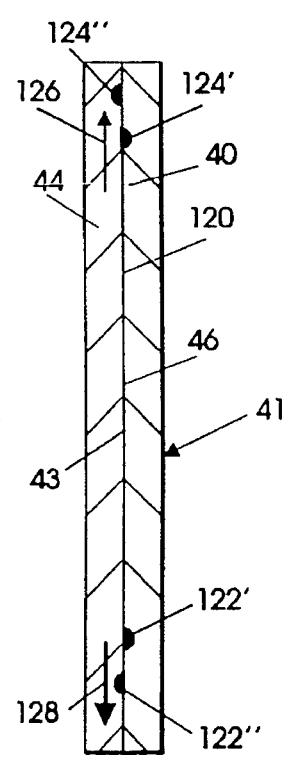

The anchoring points about the spindle may be located at a mid zone location as illustrated in FIGS. 13 and 14. FIGS. 13 and 14 represent zones similar to FIGS. 7 and 8. As with FIG. 7, FIG. 13 represents the zone at ambient temperature; and as with FIG. 8, FIG. 14 represents the zone at a warmed temperature. Arrows 126 and 128 illustrate the displacement of datum points 122" and 124" relative to datum points 122' and 124' when the anchor point 120 is located at a mid point of the zone illustrated in FIG. 14. When all anchor points are located at the same relative longitudinal intermediate point of the hub 44/spindle 40 interface, thermal growth and displacement of the hub 44 relative to the spindle 40 is divided and directed in opposite directions as indicated by arrows 126, 128 which are oriented substantially perpendicular to a band of anchor points 120 formed by the anchor points of all such longitudinal zones 41 about spindle 40.

As a further example, reference is again made to FIG. 2. If the highest frictional force exerted between hub 44 and spindle 40 in a particular longitudinal region parallel to axis 32 lies at point 60, near or at the top of the longitudinal region between the hub 44 and spindle 40 on the lefthand portion of FIG. 2, and a similar highest frictional force for a longitudinal region located opposite point 60 and similarly parallel to axis 32 is disposed at point 62, a potential for disk stack 12 tilting or cocking occurs.

In order to understand the phenomena, it is assumed that since the highest frictional forces exist at points 60 and 62, if any force is exerted on other points lying in a longitudinal regions parallel to axis 32 and including points 60 or 62, those lesser magnitude frictional forces would be overcome prior to any movement at points 60 and 62 occurring. From a practical standpoint, the spindle 40 must be made of iron or a ferrous material to form a portion of the magnetic circuit including the field magnets 38 and coil 34. Therefore, for example, the thermal expansion of the aluminum of hub 44 along a longitudinal line extending from point 60 and parallel to axis 32 will be approximately twice that of the spindle 40. Since the coefficient of expansion of aluminum is approximately twice that of the iron portion of the spindle 40, the hub 44 will attempt to longitudinally grow at approximately twice the rate of the spindle 40, relative to point 60. The growth of both spindle 40 and hub 44 will be in a downward direction as illustrated in FIG. 2. As can be seen, the bottommost disk 14 on the lefthand side of FIG. 2 will tend to move downward relative to spindle 40.

A similar analysis with regard to point 62 results in a conclusion that the movement of the disks 14 will all be in an upward direction on the right side of FIG. 2, due to the growth of the hub 44 upward and away from point 62 with the increase in operating temperatures. Since movement of the hub 44 and disks 14 will tend to be upward with respect to point 62, the disks 14 will tend to be high on the right and low on the left resulting in wobble of the hub 44 and disk stack 12. The hub 44 will in effect be cocked or tilted in a clockwise direction in FIG. 2.

One of skill in the art may recognize that if point 60 and point 62 both lie on a plane or within a very close distance to a plane which is perpendicular to axis 32 where the plane intersects spindle 40/hub 44 interface, all of the thermal growth due to warming of hub 44 then would be in one direction substantially perpendicular to the above-described plane.

If the anchor points 61, 63 similar to points 60 and 62 were located within the narrow limits of the zone 66' of contact between hub 44 and spindle 40, then the thermal growth could occur in two directions on opposite sides of the anchoring zone 66' which includes points 61 and 63. In either case, the growth would be anchored and originate from a narrow zone of contact 66 or 66' extending about the exterior surface 43 of spindle 40 and forming a circle or very narrow zone, as described above, surrounding both the axis 32 and spindle 40.

Illustrated on the righthand portion of spindle 40 is line 66 which represents either a line of anchoring contact or a very narrow band or zone of anchoring contact which is continuous and extends completely around the spindle 40. The location of contact zone 66 is illustrated at the upper portion of the cylindrical outer surface 43 of spindle 40 but may be positioned on the interface between hub surface 46 and spindle surface 43 and along any part of the interface. Line or zone of contact 66 will serve as anchoring points for hub 44 relative to spindle 40 and will then direct the thermal growth induced movement of hub 44 along spindle surface 43 in a direction substantially perpendicular to zone 66.

From a practical point, the anchoring circle may be slightly widened to create a narrow cylindrical zone with substantially identical results. In order to define the circumscribing contact zone 66' including points 61 and 63 and to insure that zone 66' remains fixed with respect to the external cylindrical surface 43 of the spindle 40 and the internal cylindrical surface 46 of hub 44, it then is necessary to relieve the forces that may be generated in zones displaced and projecting away from and substantially perpendicular to the anchoring zone 66 or 66' circumscribing spindle 40.

Direction and control of the movement of hub 44 with respect to zone 66 will be in one direction perpendicular to the zone of anchoring contact 66. Should it be desired to locate the zone of contact 66 at a position permitting thermal growth in two directions, opposite to each other, the zone of contact then may be positioned at or near the position indicated by line 66', thereby permitting growth in two opposed directions. The direction definition is influenced by relieving either the surface 43 of spindle 40 or surface 46 of hub 44 to prevent surface engagement between hub 44 and spindle 40 in selected regions. With a reduced area of engagement between the two surfaces 43 and 46, any movement between hub 44 and spindle 40 will occur in the area of reduced engagement and thus insure that the anchoring zone of engagement 66 remains effective and holds the hub 44 at that anchor point in precise location with the spindle 40.

The engagement contact surface may be formed on the exterior 43 of the spindle 40 or on the interior 46 of hub 44. The location of the engagement surface and consequently the location of the recessed areas eliminating contact may be formed by any conventional process such as machining, etching, or diecast molding. Some patterns will lend themselves more conveniently to one manufacturing process over another. The choice of the process will be to some extent, but not totally, dictated by the pattern selected.

Figure 5:
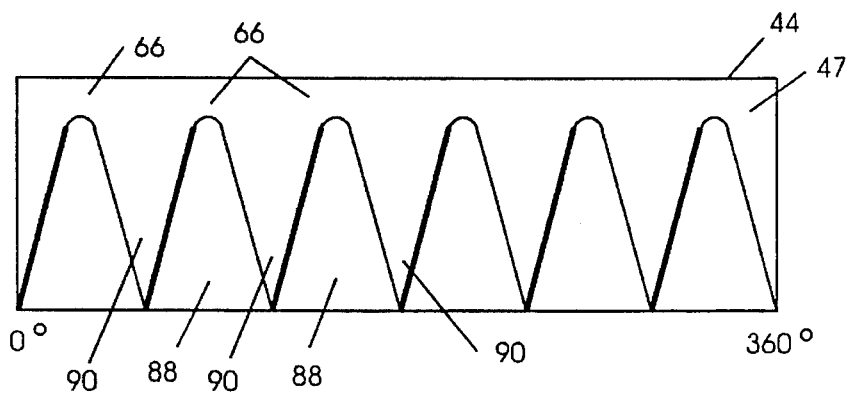
Figure 6:
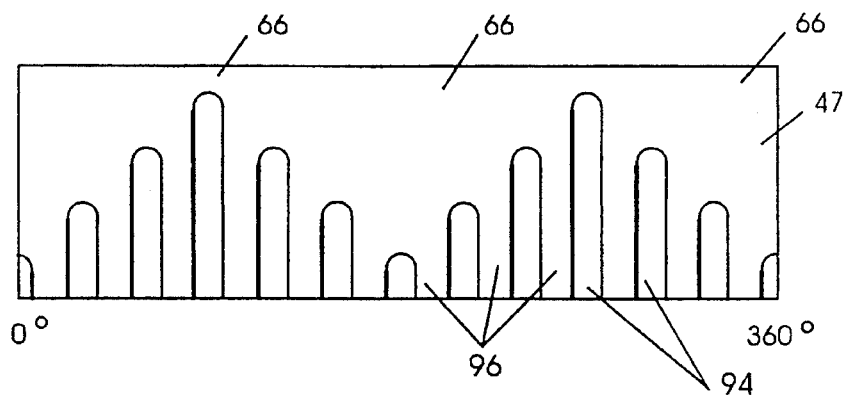

The pattern of engagement also will determine whether thermal growth of the hub 44 with respect to the spindle 40 is unidirectional or if the growth is bidirectional. A pattern resulting in bidirectional growth is disclosed in both FIGS. 3 and 4. Patterns resulting in unidirectional thermal growth of the hub 44 are illustrated in FIGS. 5 and 6.

Figure 3:
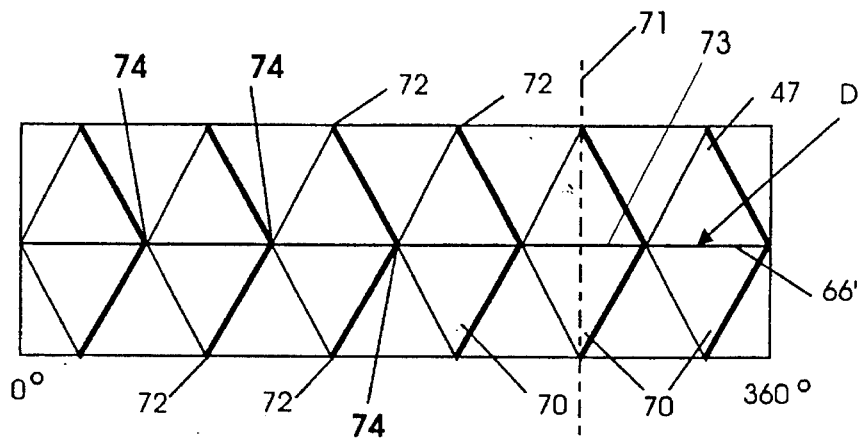

Referring now to FIG. 3, in accord with this invention, a pattern 47 is illustrated which would be found on either the exterior cylindrical surface 43 of spindle 40 or the interior cylindrical surface 46 of hub 44. The pattern 47 of the engagement surface 46 of hub 44, for example, is that of a plurality of diamond-shaped areas 70. The diamonds 70 are joined together at their points 74. The pattern 47 is illustrated as lying within a rectangle; while in reality, the pattern 47 extends around a cylindrical surface 46 or 43 and is continuous when joined at the 0 degree and 360 degree boundaries. The engagement of the raised areas 70 with either the complimenting cylindrical surface 43 or surface 46 will be adequate to insure that the rotation of the hub 44 is in complete synchronization with the spindle 40.

The diamond-shaped regions 70 have two axes 71 and 73 which are generally perpendicular to each other. Axis 73 is co-located with zone 66' to be described later.

Resistance to relative movement between the hub 44 and spindle 40 will be reduced at a minimum at the upper and lower extremities 72 of diamond 70 due to the reduced areas of surface engagement. The extremities 72 will offer virtually no resistance to the thermally induced translation between hub 44 and spindle 40 while the resistance offered at the connection points 74 between adjacent diamond-shaped surfaces 70 will offer the maximum resistance to relative movement of the hub with respect to spindle 40 and serve as the anchoring zone 66'. Therefore, it can be seen that the hub 44 can thermally grow bidirectionally from zone 66'.

Figure 4:
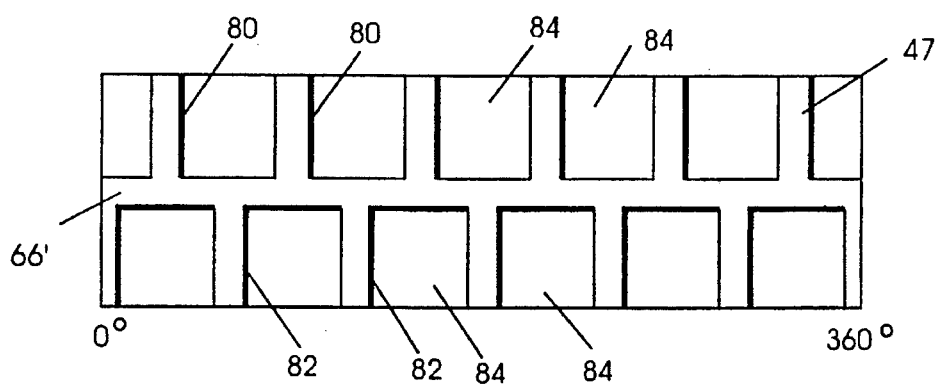

An alternative pattern for definition and control of thermally induced bidirectional movement and to accommodate thermal growth mismatch is illustrated in FIG. 4. In FIG. 4, anchoring zone 66' is shown as a narrow band or zone of engagement which will circumscribe the spindle 40. Extending perpendicularly from zone 66', in both directions, are contact zones 80 and 82. In the relatively large regions 84 where contact between the hub 44 and spindle 40 has been eliminated, the thermal growth of the hub 44 is directed in a bidirectional manner while still firmly anchoring the hub 44 at zone 66'. This insures that the hub 44 will not become cocked or tilted relative to axis 32 in FIG. 2 as hub 44 is anchored to spindle 40 on a plane perpendicular to axis 32.

Examples of unilateral directional control patterns are FIGS. 5 and 6. In FIG. 5, generally triangular-shaped regions of relief 88 are formed to eliminate contact between hub 44 and spindle 40 in these areas. The zone of contact 66 which is continuous in nature is located on the upperside of the interface, as illustrated in FIG. 5. Again, both in FIG. 5 and FIG. 6, the contact patterns 47 are projected onto a plane but represent a cylindrical surface pattern. FIG. 5 has an additional advantage from a manufacturing standpoint in that the depending regions or zones of contact 90 and contact zone 66 may be formed by diecasting the hub 44. With the hub 44 typically diecast, the recessed areas 88 in the contact surface 46 may be formed as part of the draft of a diecasting die. Therefore, this particular pattern 47 of FIG. 5 results from very inexpensive modification of the manufacturing tooling. Providing this surface engagement pattern 47 for the interface contact becomes essentially a no cost improvement as well as a tremendous benefit in the reliability of the disk drive 10 of FIG. 1.

FIG. 6 illustrates a still further embodiment of the invention wherein a series of channels 94 are cut or formed into the contact surface 46 if positioned on the interior of hub 44. The channels 94 extend from one end of the hub 44 toward the opposite end and terminate short of the opposite end of the contact surface 46 leaving a continuous contact zone 66 along the top of the surface 46 as illustrated in FIG. 6.

The common elements of each of the patterns in FIGS. 3, 4, 5 and 6, are a continuous zone or line of contact 66 or 66' completely surrounding axis 32 at the interface between surface 43 and surface 46 and, additionally, reduced areas of surface contact extending from the continuous contact zone 66 or 66' toward at least one edge of the cylindrical surfaces 43 or 46. One should recognize that the line or zone of contact could be intermittent so long as the extent of contact is greater than the extent of contact in any parallel zone or line.

These patterns illustrated in FIGS. 3, 4, 5, and 6 particularly lend themselves to shrink fit engagements where the hub 44 can be loosely fitted around and positioned as desired relative to spindle 40, and then the two elements 40, 44 permitted to return to ambient temperatures. In a shrink fit operation, there are no substantial distorting forces other than thermal forces during assembly; therefore, the relatively sharp points 72 in FIG. 3 and the terminal ends of contact zones 82 in FIG. 4, contact zones 90 in FIG. 5 and contact zones 96 in FIG. 6 will not be damaged or destroyed as might be the case with a force fitting assembly technique. Force fitting may be used if the deformation of the zones 70, 82, 90 and 96 are not severely damaged or deformed.

With the reduced areas of contact lying at or near the edges of the overall contact surface 46 or 43, any movement of the hub 44 or a portion thereof with respect to spindle 40 will be effectively channeled toward the area of reduced surface contact because the continuous contact zone 66 or 66' will anchor the hub 44 to the spindle 40 at that point and insure consistent contact and positioning at that area relative to spindle 40.

While the surfaces illustrated in FIGS. 3, 4, 5 and 6 are illustrated as formed into surface 46 or formed on surface 46 of hub 44, the same pattern may be formed on surface 43 of spindle 40 with equal efficacy. The determination of which of the surfaces 46, 43 are altered will depend upon manufacturing techniques and cost considerations. Similarly the manufacturing technique for relieving the relief areas thereby forming the contact surfaces and zones may be dictated by the surface 46 or 43 selected for alteration.

While one of skill in the prior art may conceive of different patterns having the same general characteristics as the patterns disclosed but having the same general characteristics, these changes and alterations would fall within the scope of the invention as defined by the attached claims.

I claim:

1. A disk drive comprising a:
   a frame for supporting components of said disk drive;
   a motor supported on said frame;
   said motor comprising a shaft having an axis, an electrical coil, and a rotor comprising a spindle and field magnets supported by said spindle, said spindle mounted for rotation about said axis;
   said spindle having a cylindrical exterior surface;
   a hub having a cylindrical interior surface, said cylindrical interior surface engaged with said external cylindrical surface of said spindle, said spindle and said hub forming an interference fit therebetween;
   at least one magnetically recordable disk radially extending from and attached to said hub for rotation therewith;
   one of said cylindrical interior surface of said hub or said cylindrical exterior surface of said spindle having formed therein a repetitive pattern of reliefs to define a pattern on said one of said surfaces for interference fit engagement with said other of said surfaces, said pattern forming at least a line of contact between said hub and said spindle.

2. The disk drive of claim i wherein said pattern is defined by said reliefs which are triangular shaped areas.

3. The disk drive of claim 2 wherein said pattern diminishes engagement of said hub and said spindle in zones parallel to said line of contact at increased distances in a direction parallel to said axis.

4. The disk drive of claim 3 wherein said pattern comprises diamond-shaped areas of engagement wherein said diamond-shaped areas each have a pair of axes and where said axes are perpendicular and disposed so that one said axis of each diamond-shaped area joins to an axis of an adjacent diamond-shaped area to form said line of engagement.

5. The disk drive of claim 1 wherein said pattern is defined by a single band of surface for engagement circumscribing one of said cylindrical surfaces and a plurality of zones of said surface extending from said band and parallel to said axis.

6. The disk drive of claim 5 wherein said zones extend in a single direction from said band.

7. The disk drive of claim 6 wherein said zones each extend for a defined length and are uniform in width throughout said length.

8. The disk drive of claim 6 wherein said zones each extend for a defined length and are of diminished width at distances most remote from said band.

9. The disk drive of claim 5 wherein said zones extend in two opposed directions from said band.

10. The disk drive of claim 9 wherein said zones each extend for a defined length and are uniform in width throughout said length.

11. The disk drive of claim 9 wherein said zones each extend for a defined length and are of diminished width at distances most remote from said band.

12. A method of attaching a hub of a magnetic storage disk drive to a spindle of said drive, comprising the steps of:
    providing a spindle having an exterior cylindrical surface and an axis of rotation;
    providing a hub having an internal cylindrical surface for assembly with and engagement to said exterior surface of said spindle;
    forming, into one of said surfaces, a repetitive pattern of reliefs to prevent engagement between said surfaces at the location of said reliefs, said reliefs arranged to form a continuous zone of said surface for engagement with said other surface, and a plurality of regions of said surface for engagement with said other surface, said plurality of regions extending from said continuous zone;
    disposing said hub around said spindle and engaging said continuous zone and said regions with said other surface in an interference fit,
    whereby said hub and said spindle of said disk drive are joined together with an interference fit and longitudinal thermal expansion of said joined hub and spindle will be directed away from and relative to said continuous zone and said band will act as an anchoring location having no relative movement between said hub and said spindle during any operational heating or cooling of said hub and said spindle.

13. The method of claim 12 wherein said step of disposing said hub around said spindle includes the further steps of heating said hub to expand said hub and cooling said spindle to shrink said spindle.

14. The method of claim 13 wherein said forming step includes the step of shaping said reliefs to progressively reduce the width of each of said zones as distance increases from said band.

15. The method of claim 14 wherein said forming step further includes the step of diecasting said hub with said reliefs formed by the die into said interior cylindrical surface of said hub.

16. The method of claim 14 wherein said step of forming further includes the step disposing said reliefs on two sides of said band.

* * * * *